United States Patent [19]

Barnes et al.

[11] 4,296,187
[45] Oct. 20, 1981

[54] INTEGRATED CARBON/INSULATOR STRUCTURE AND METHOD FOR FABRICATING SAME

[75] Inventors: John E. Barnes, Wakefield; Franz Goebel, Sudbury; William T. McHugh, Westwood, all of Mass.

[73] Assignee: GTE Products Corporation, Stamford, Conn.

[21] Appl. No.: 159,266

[22] Filed: Jun. 13, 1980

[51] Int. Cl.³ .............................................. H01M 6/14
[52] U.S. Cl. .................................. 429/105; 429/194; 429/199; 429/209
[58] Field of Search ............... 429/101, 105, 104, 194, 429/199, 144, 142, 209, 252, 247

[56] References Cited

U.S. PATENT DOCUMENTS 3,997,366 12/1976 Davis, Jr. ............................ 429/144
4,218,523 8/1980 Kalnoki-Kis ....................... 429/101

*Primary Examiner*—Anthony Skapars
*Attorney, Agent, or Firm*—Peter Xiarhos

[57] ABSTRACT

A thin, integrated carbon/insulator structure, and a method for fabricating same, for use in a primary electrochemical cell. A quantity of a wet carbon slurry material including a mixture of carbon black, water and/or isopropyl alcohol, and a binder such as finely-divided "Teflon" in suspension, is deposited onto a porous fiberglass substrate and rolled to a prescribed thickness. The rolling operation causes a portion of the slurry material to diffuse into the surface of the porous fiberglass substrate and permanently adhere to and unite with a surface portion of the fiberglass substrate in an integrated, interlocking fashion.

The fiberglass substrate having the layer of carbon slurry material integrated therewith is then dried to cause the layer of carbon slurry material to dry and shrink to the form of a layer of carbon plaque having a network of cracks produced therethrough in a random pattern as a result of the shrinkage during drying. The layer of carbon plaque at this stage represents an aggregation of porous carbon globules. The layer of carbon plaque is re-rolled to close cracks at the upper surface of the layer while simultaneously establishing a desired thickness for the layer. After curing the above arrangement to increase adherence of the carbon globules to each other and to the fiberglass substrate, an integrated carbon/insulator structure of a desired size and configuration for use in a primary electrochemical cell can be cut out from the abovedescribed arrangement.

11 Claims, 7 Drawing Figures

INTEGRATED CARBON/INSULATOR STRUCTURE AND METHOD FOR FABRICATING SAME

CROSS-REFERENCE TO RELATED APPLICATION

In co-pending patent application Ser. No. 159,271, filed concurrently herewith in the names of Franz Goebel and William T. McHugh, and entitled "ELECTROCHEMICAL CELL", there is disclosed and claimed an electrochemical cell utilizing integrated carbon/insulator structures as fabricated in accordance with the present invention.

BACKGROUND OF THE INVENTION

The present invention relates to a carbon/insulator structure and, more particularly, to a thin, integrated carbon/insulator structure for a primary electrochemical cell. The invention also relates to a method for fabricating thin integrated carbon/insulator structures for primary electrochemical cells.

Primary electrochemical cells are utilized for a wide variety of applications and are commonly available in a large assortment of sizes and shapes. A common design of an electrochemical cell includes an electrochemical system comprising an anode, a porous carbon cathode structure separated from the anode by a porous separator, and an electrolytic solution in contact with the aforementioned cell components. In a preferred construction of a cell, the anode includes an oxidizable active alkali metal such as lithium, the carbon cathode structure includes an aggregation of porous carbon globules or conglomerates, the porous separator is of fiberglass, and the electrolytic solution is a cathodelectrolyte solution including a reducible soluble cathode such as thionyl chloride and an electrolyte solute such as lithium tetrachloro-aluminate dissolved in the thionyl chloride.

In an electrochemical cell as described hereinabove, it is sometimes desirable to achieve a high discharge rate (greater than 1 mA/cm$^2$) for a relatively short period of time. This result can ordinarily best be achieved by using thin electrodes, including the aforementioned porous carbon cathode structures. Thin porous carbon cathode structures have been produced by spraying or otherwise depositing a carbon slurry material onto a thin metallic substrate which is then processed (e.g., by drying and curing operations) to achieve a carbon thickness on the metallic substrate in a range of 0.001 to 0.005 inch. Electrodes produced in this fashion, however, are very fragile and difficult to handle. Further, in the case of electrodes having a carbon thickness in the upper end of the abovementioned range, the carbon is susceptible to blistering and falling apart, thereby requiring relatively thick metallic substrates for support purposes. The metallic substrates are also required where the carbon thickness is to be controlled over a large surface area.

BRIEF SUMMARY OF THE INVENTION

In accordance with the present invention, an integrated carbon/insulator structure is provided, and a method for fabricating same, for use in an electrochemical cell, in particular, a high-rate cell. The integrated carbon-insulator structure in accordance with the invention includes a porous substrate and a porous layer of carbon material supported by the porous substrate. The porous substrate is of an electrically-nonconductive material of a predetermined thickness. The porous layer of carbon material has a predetermined thickness and further has a portion thereof at its interface with the porous substrate permanently diffused into and interlocking with a portion of the porous substrate thereby to form an integrated structure with the porous substrate.

To fabricate an integrated carbon/insulator structure as described hereinabove in accordance with the invention, a quantity of a wet carbon slurry material is first deposited onto a porous sheet of an electrically-nonconductive substrate material. The quantity of wet carbon slurry material is then worked onto and across the porous sheet of electrically-nonconductive substrate material to achieve a layer of desired thickness for the carbon slurry material and to cause a portion of the carbon slurry material to diffuse into the surface of the porous sheet of substrate material and permanently adhere to and unite with a portion of the sheet of substrate material in an integrated, interlocking fashion. The sheet of substrate material having the layer of carbon slurry material integrated therewith is then dried to cause the layer of carbon slurry material to dry and shrink to the form of a layer of carbon plaque comprising an aggregation of porous carbon globules and having a network of cracks produced therethrough in a random pattern as a result of the shrinkage during drying. The layer of carbon plaque is then reworked to close cracks at the upper surface of the layer of carbon plaque while simultaneously maintaining a desired thickness for said layer. An integrated carbon/insulator structure of a desired size and configuration may then be cut out from the sheet of substrate material having the reworked layer of carbon plaque interlocked therewith.

An integrated carbon/insulator structure as fabricated in accordance with the above method may be utilized with other components to form a battery stack for an electrochemical cell. This battery stack is employed together with an electrolytic solution to form an electrochemical system for the cell and includes, in addition to the abovedescribed integrated carbon/insulator structure, an anode structure adjacent to the carbon/insulator structure and contained together with the carbon/insulator structure within a metal housing of the cell. In a preferred form of the cell, the anode is of an oxidizable alkali metal such as lithium, and the electrolytic solution includes a cathodelectrolyte solution comprising a reducible soluble cathode, such as thionyl chloride, and an electrolyte solute, such as lithium tetrachloro-aluminate, dissolved in the thionyl chloride.

BRIEF DESCRIPTION OF THE DRAWING

Various objects, features and advantages of an integrated carbon/insulator structure, and a method for fabricating same, will be apparent from a detailed discussion taken in conjunction with the accompanying drawing in which.

DETAILED DESCRIPTION OF THE INVENTION

Figure 1:
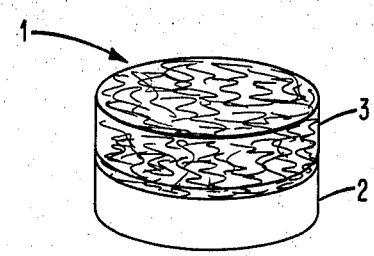
FIG. 1 is an enlarged perspective view of an integrated carbon/insulator structure in accordance with the present invention.

Referring now to FIG. 1, there is shown an integrated carbon/insulator structure 1 for a primary electrochemical cell as fabricated in accordance with the fabrication method of the present invention. The carbon/insulator structure 1 as shown in FIG. 1 generally comprises a thin porous substrate 2 having a thin porous layer of carbon material 3 integrated therewith at the interface of the substrate 2 and the porous layer 3. The substrate 2 may be of an electrically nonconductive, i.e., insulative, material such as fiberglass (e.g., of the woven or non-woven type). A suitable thickness for the substrate 2 as used in the present invention is 0.005 inch, although other thickenesses within a range of 0.001 to 0.007 inch may also be used. The porous layer of carbon material 3 integrated with the substrate 2 comprises an aggregation of porous carbon globules or conglomerates. As shown in the cross sectional view of FIG. 2, the layer of carbon conglomerates permanently interlocks, or "knits" with, the upper surface region of the substrate 2 so as to form an integrated structure with the substrate 2. The layer of carbon conglomerates as employed with the substrate 2 (of 0.005 inch thickness) may have a thickness of 0.003 to 0.020 inch with approximately 0.001 to 0.002 inch of the total thickness of the layer being integrated or united with the upper surface region of the substrate 2.

Figure 2:
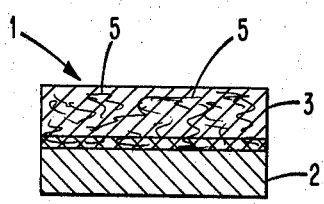
FIG. 2 is an enlarged cross-sectional view of the carbon/insulator structure of FIG. 1.
Figure 7:
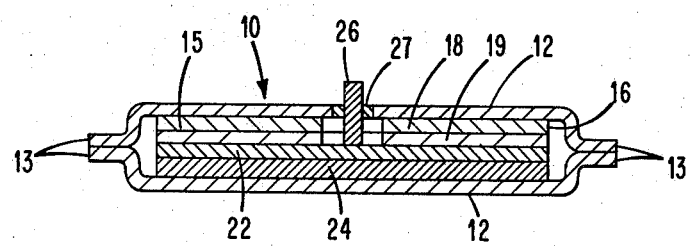
FIG. 7 is an elevational view, partly in cross section, of a primary electrochemical cell employing an integrated carbon/insulator structure in accordance with the present invention.

As also shown schematically in FIG. 2, the layer of carbon conglomerates has a plurality of channels 5 formed therein. These channels, which are produced in the layer of carbon conglomerates in a manner to be described in detail hereinafter, act as electrolyte-conducting channels when the carbon/insulator structure 1 is employed in an electrochemical cell. In this case, the electrolytic solution of the cell is able to thoroughly permeate the porous carbon conglomerates by way of these channels whereupon the porous substrate 2 is also thoroughly permeated by the electrolytic solution. The porous subsrate 2 in this particular application, in addition to serving as a mechanical support or substrate for the layer of carbon conglomerates, also serves as a separator for separating, or electrically isolating, the porous layer of carbon conglomerates from a metal electrode of the cell such as a lithium anode. An example of the abovementioned application for the carbon/insulator structure is shown in FIG. 7, to be described in detail hereinafter, and also described in the aforementioned co-pending application Ser. No. 159,271 to which reference may be made for specific details.

Figure 3:
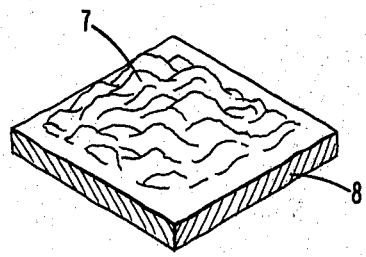
FIGS. 3–6 illustrate various steps in the fabrication of an integrated carbon/insulator structure as shown in FIG. 1.
Figure 4:
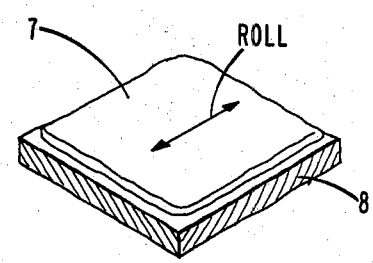

The carbon/insulator structure 1 as described hereinabove may be fabricated in the following manner. A quantity 7 of a wet carbon slurry material is first deposited and spread across a flat sheet or substrate 8 of fiberglass (woven or non-woven) as shown in FIG. 3, and then rolled to a desired thickness and form as shown in FIG. 4. A preferred composition of the carbon slurry material as employed by the invention generally comprises a mixture of carbon black (e.g., Shawinigan carbon black), water and/or isopropyl alcohol, and a binder such as finely-divided "Teflon" (tetrafluoroethylene fluorocarbon polymers and fluorinated ethylene-propylene resins) in suspension. The combination and amounts of the above ingredients of the carbon slurry material may be varied as desired to achieve the desired consistency for the carbon slurry material, that is, a paste or dough-like consistency or a heavy syrup-like consistency. Generally, the wetter the slurry material the more difficult it is to control the thickness of carbon on the fiberglass substrate 8 although more electrolyte-conducting channels will be produced throughout the carbon when a wet or syrup-like slurry material is used as opposed to a drier, dough-like slurry material.

Figure 5:
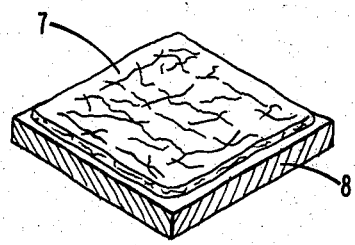

As the carbon slurry material is spread onto the substrate 8 of fiberglass and rolled to the desired thickness, for example, 0.003 to 0.020 inch, the carbon slurry material diffuses into the upper surface region of the fiberglass substrate 8 and permanently adheres to it in an interlocking fashion. The rolling operation by which the above result is achieved may be performed by hand, for example, by a rod, or by commercially available rolling apparatus (not shown). For hand rolling, the desired thickness of the carbon slurry material may be ascertained by simple caliper measurements. Once the above rolling operation has been completed, the excess of water and/or alcohol is drained off or otherwise removed from the combined carbon slurry/substrate arrangement. This operation can be readily accomplished by simply blotting the carbon slurry/substrate arrangement with a sheet of blotting paper or, alternatively, by sandwiching the arrangement between a pair of sheets of blotting paper. The carbon slurry/substrate arrangement is then dried at a temperature of about 100° C. for a period of time sufficient to completely dry the arrangement. As the carbon slurry material and the fiberglass substrate 8 dry, the carbon slurry material dries to a plaque state in which a number of cracks form in a random pattern throughout the dried carbon material as indicated, for example, in FIG. 5. These cracks develop as a result of the carbon material simultaneously adhering to the fiberglass substrate 8 and shrinking as the water and/or alcohol is driven off by the drying process. As mentioned hereinabove, the wetter the initial carbon slurry material, the greater the number of cracks that will form in the carbon plaque. The carbon plaque as formed on the fiberglass substrate 8 as discussed above takes the form of an aggregation of porous carbon globules or conglomerates.

Figure 6:
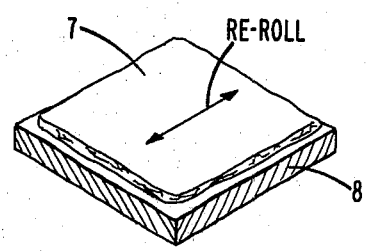

Once the above drying operation has been completed, the porous carbon plaque on the fiberglass substrate 8 is rolled again to close some of the cracks in the carbon plaque which have formed as a result of shrinkage during drying, while simultaneously maintaining a desired thickness (approximately 0.003 to 0.020 inch) for the carbon plaque layer. This re-rolling operation serves primarily to close the cracks at the upper surface of the carbon material. The carbon material and the fiberglass substrate 8 are then cured at a temperature of about 270° C. so that the porous globules of the carbon material better adhere to each other and to the fiberglass substrate 8. After this curing operation, a carbon/insulator structure of any desired shape and size, for example, as shown in FIG. 1, may be cut out of or stamped by any suitable apparatus (not shown) from the arrangement of the carbon material and the fiberglass substrate 8 as shown in FIG. 6. This integrated carbon/insulator structure has the desirable characteristics of being very thin, for example, between 0.010 and 0.025 inch, with a uniform carbon thickness, for example, approximately 0.003 to 0.020 inch, and a uniform carbon density.

An integrated carbon/insulator structure as produced by the abovedescribed fabrication technique may be used as desired in an electrochemical cell utilizing a cathodelectrolyte solution as previously described. The cathodelectrolyte solution is able completely to permeate and saturate the porous carbon material and the porous fiberglass substrate to which it is fixed by way of the cracks formed in the carbon plaque and serving as electrolyte-conducting channels. The permeation of the porous carbon material provides substantial active surface areas or sites for the catalytic reduction of the cathode solvent in the cathodelectrolyte solution, resulting in an increase in the rate capability and discharge capacity of the cell.

Referring now to FIG. 7, there is shown a primary electrochemical cell 10 of the so-called "button-type" employing an integrated carbon/insulator structure in accordance with the invention as described hereinabove. The electrochemical cell 10 as shown in FIG. 7 includes a pair of similar disc-like metal housing members 12 which are welded together at outwardly turned rims 13 to form a unitary housing within which a battery stack 15 is contained. This battery stack comprises an integrated carbon/insulator structure 16 in direct physical contact with the upper housing member 12 and including a porous carbon layer 18 integrated with a porous fiberglass insulator or substrate 19; a flat anode member 22, for example, in the form of a disc, in direct physical contact with the porous insulator 19; and a flat separator 24 intermediate to and in direct physical contact with the anode member 22 and the lower housing member 12.

The anode member 22 may be of an oxidizable alkali metal such as lithium, and the separator 24 may be of fiberglass. The integrated carbon/insulator structure 16 has an opening therethrough by which an electrical terminal 26 may make physical and electrical contact with the anode member 22. The terminal 26 itself, representing a first electrical terminal of the cell 10, is electrically isolated from the upper metal housing 12 by means of a standard glass or ceramic-to-metal seal 27. The metal housing members 12 represent a second electrical terminal of the cell 10.

The battery stack 15 as described hereinabove is exposed to and permeated by an electrolytic solution. This solution may be a cathodelectrolyte solution comprising a reducible soluble cathode, such as thionyl chloride, and an electrolyte solute, such as lithium tetrachloroaluminate, dissolved in the thionyl chloride. The cathodelectrolyte solution permeates the porous carbon layer 18 by way of the network of electrolyte-conducting channels in the carbon layer 18, thereby making contact with interior cathodic particles and providing substantial active surface areas or sites for the catalytic reduction of the thionyl chloride. During the discharge of the cell 10, the housing members 12 contact the carbon layer 18 to function as a current collector.

While there has been described an integrated carbon/insulator structure for an electrochemical cell and a preferred method for fabricating same in accordance with the invention, it will be apparent to those skilled in the art that various changes and modifications may be made therein without departing from the invention as called for in the appended claims.

What is claimed is:

1. An integrated carbon/insulator structure for an electrochemical cell, comprising:

a porous substrate of an electrically-nonconductive material and having a predetermined thickness; and
   a porous layer of a carbon material supported by the porous substrate, said layer of carbon material having a predetermined thickness and further having a portion thereof at its interface with the porous substrate permanently diffused into and interlocking with a portion of the porous substrate thereby to form an integrated structure with the porous substrate.

2. An integrated carbon/insulator structure in accordance with claim 1 wherein:

the porous layer of carbon material comprises an aggregation of porous carbon globules defining a network of channels therethrough.

3. An integrated/insulator structure in accordance with claim 2 wherein:

the porous substrate is of fiberglass; and
   the carbon globules of the porous layer of carbon material include carbon black.

4. An integrated carbon/insulator structure in accordance with claim 3 wherein:

the porous substrate has a thickness in the range of 0.001 to 0.007 inch; and
   the porous layer of carbon material has a thickness in the range of 0.003 to 0.020 inch.

5. An integrated carbon/insulator structure in accordance with claim 3 wherein:

the porous substrate has a thickness of 0.005 inch;
   the porous layer of carbon material has a thickness in the range of 0.003 to 0.020 inch; and
   the interlocking portions of the porous substrate and the porous layer of carbon material have a thickness of 0.001 to 0.002 inch.

6. An integrated carbon/insulator structure in accordance with claim 3 wherein:

the carbon globules of the porous layer of carbon material further include a binder material for increasing the adhesion of the carbon globules to each other and to the porous substrate.

7. An electrochemical cell comprising:

a metal housing;
   an electrochemical system within the metal housing and including an electrolytic solution and a battery stack exposed to said electrolytic solution, said battery stack comprising:
      an anode; and
      an integrated carbon/insulator structure adjacent to the anode, said integrated carbon/insulator structure comprising:
         a porous substrate of an electrically-non-conductive material adjacent to the anode and having a predetermined thickness; and
         a porous layer of a carbon material supported by the porous substrate, said layer of carbon material having a predetermined thickness and further having a portion thereof at its interface with the porous substrate permanently diffused into and interlocking with a portion of the porous substrate thereby to form an integrated structure with the porous substrate.

8. An electrochemical cell in accordance with claim 7 wherein:

the anode is of an oxidizable alkali metal;
   the porous layer of carbon material comprises an aggregation of porous carbon globules defining a network of electrolyte-conducting channels therethrough; and the electrolytic solution includes a cathodelectrolyte solution comprising a reducible soluble cathode and an electrolyte solute dissolved in the reducible soluble cathode.

9. An electrochemical cell in accordance with claim 8 wherein:
the anode is of lithium;
the reducible soluble cathode of the cathodelectrolyte solution is thionyl chloride; and
the electrolyte solute of the cathodelectrolyte solution is lithium tetrachloroaluminate.

10. An electrochemical cell in accordance with claim 9 wherein:
the porous substrate is of fiberglass; and
the carbon globules of the porous layer of carbon material include carbon black.

11. An electrochemical cell in accordance with claim 10 wherein:
the carbon globules of the porous layer of carbon material further include a binder material for increasing the adhesion of the carbon globules to each other and to the porous substrate.

* * * * *